US005625521A

United States Patent [19]
Luu

[11] Patent Number: 5,625,521
[45] Date of Patent: Apr. 29, 1997

[54] SURGE PROTECTION CIRCUITRY

[75] Inventor: Lionel T. V. Luu, Hong Kong, Hong Kong

[73] Assignee: Pacusma Co.,Ltd., Hong Kong

[21] Appl. No.: 279,154

[22] Filed: Jul. 22, 1994

[51] Int. Cl.$^6$ .................................................. H02H 3/20
[52] U.S. Cl. .................................................. 361/111; 361/56
[58] Field of Search ........................ 361/56, 58, 110, 361/111, 117, 118, 119, 91

[56] References Cited

U.S. PATENT DOCUMENTS

| | | | |
|---|---|---|---|
| 4,554,608 | 11/1985 | Block | 361/119 |
| 4,587,588 | 5/1986 | Goldstein | 361/54 |
| 4,628,394 | 12/1986 | Crosby et al. | 361/56 |
| 4,675,772 | 6/1987 | Epstein | 361/56 |
| 4,677,518 | 6/1987 | Hershfield | 361/56 |
| 4,760,485 | 7/1988 | Ari et al. | 361/54 |
| 4,802,055 | 1/1989 | Beckermann | 361/56 |
| 4,807,083 | 2/1989 | Austin | 361/111 |
| 4,901,183 | 2/1990 | Lee | 361/56 |
| 4,903,161 | 2/1990 | Huber et al. | 361/56 |
| 5,153,806 | 10/1992 | Corey | 361/56 |
| 5,229,909 | 7/1993 | Tessmer et al. | 361/111 |
| 5,412,526 | 5/1995 | Kapp et al. | 361/56 |

OTHER PUBLICATIONS

U.S. Patent Application Ser. No. 07/616,859, filed Nov. 21, 1990.

Primary Examiner—Jeffrey A. Gaffin
Assistant Examiner—Ronald W. Leja
Attorney, Agent, or Firm—Ostrolenk, Faber, Gerb & Soffen, LLP

[57] ABSTRACT

A three stage surge protection circuit for a three conductor power supply system. Each of the surge suppression stages include a varistor coupled across the line conductor and the neutral conductor, a varistor coupled across the neutral conductor and the ground conductor, and a varistor coupled across the line conductor and the ground conductor. The first and third surge suppression stages also include a Zener diode coupled across the line conductor and the neutral conductor. The invention also relates to a circuit for protecting electrical devices coupled to shielded cable. In this embodiment, a first surge suppression device, such as a varistor or a gas tube, is coupled across the signal conductor of a coaxial cable and ground, and second surge suppression device, again either a gas tube or a varistor, is coupled between the ground shield conductor of the shielded cable and ground.

19 Claims, 4 Drawing Sheets

SURGE PROTECTION CIRCUITRY

BACKGROUND OF THE INVENTION

1. Field of the Invention

The present invention relates to circuitry for providing voltage surge suppression to protect electronic equipment from voltage surges occurring through a common household outlet, through a coaxial cable, or through a telephone line coupled to the electronic equipment.

2. Description of the Related Art

It is desirable to provide voltage surge suppressors to protect electronic equipment from transient voltage surges. Various types of household electronic products can be damaged by short duration transient voltage surges which are supplied to the products from a common household outlet or through electrical wiring such as a coaxial cable.

There are several known methods for providing transient voltage surge suppression for electronic products. One known method for protecting low voltage signal circuitry is shown in FIG. 1. A circuit 10 is provided for use with a coaxial, cable 11 including a signal conductor 12 and a shield conductor 14. The circuit 10 includes a gas tube 16 coupled across the signal conductor 12 and the shield conductor 14. The shield conductor 14 is coupled directly to ground. If the voltage across signal conductor 12 exceeds a predetermined level, the gas in tube 16 is ionized, permitting current to flow between the two electrodes inside gas tube 16. Therefore, when a voltage surge across signal conductor 12 exceeds the level at which the ionized gas current pathway forms, the voltage is clamped at the ionization voltage of gas tube 16.

Another known surge suppression circuit for a coaxial cable 11 is illustrated in FIG. 2. The circuit 18 includes a gas tube 20 coupled across the signal conductor 12 and shield conductor 14 of coaxial cable 11. A varistor 22, such as a metal oxide varistor (hereinafter "MOV"), is coupled between shield conductor 14 and ground. The surge protection circuit 18 illustrated in FIG. 2 is disclosed in U.S. Pat. No. 4,903,161. In circuit 18, if a voltage surge is generated on signal conductor 12, the voltage surge is first clamped by gas tube 20 to shield conductor 14 and then by MOV 22 to ground. If a voltage surge is generated on shield conductor 14, the voltage surge is clamped through MOV 22 to ground. The MOV 22 in circuit 18 eliminates the "ground rise" effect which occurs if a voltage surge comes from the ground line. Therefore, circuit 18 illustrated in FIG. 2 is an improvement over circuit 10 illustrated in FIG. 1. However, by adding MOV 22 between the shield conductor 14 and ground, the voltage level required to clamp a voltage surge occurring across signal conductor 12 to ground is increased by an amount equal to the MOV 22 clamping voltage rating. In other words, a larger voltage surge across signal conductor 12 is required before the initiation of voltage surge protection in circuit 18 as compared with circuit 10.

FIG. 3 illustrates two additional types of known surge protection circuitry. Circuit 24 includes a conventional voltage surge suppression circuit used with a household outlet having a line conductor 26, a neutral conductor 28, and a ground conductor 30. Voltage surges can be generated from line 26 to neutral 28, line 26 to ground 30, or neutral 28 to ground 30. The circuit 24 includes a first MOV 32 coupled across the line conductor 26 and the neutral conductor 28, a second MOV 33 coupled across the line conductor 26 and the ground conductor 30, and a third MOV 34 coupled across the neutral conductor 28 and ground conductor 30.

Circuit 25 is a voltage surge suppression circuit typically used with low voltage signal data line connections including conductors 36 and 38 illustrated in FIG. 3. Gas tubes 40 and 42 are used to couple conductors 36 and 38, respectively, to ground 30.

SUMMARY OF THE INVENTION

The present invention overcomes the deficiencies of the prior art by providing a voltage surge suppression circuit in which a first surge suppression device is coupled across the signal conductor of a coaxial cable and ground, and second surge suppression device is coupled between the ground shield conductor of the coaxial cable and ground.

One advantage of the present invention is that the signal line is coupled directly to ground through the first surge suppression device. Therefore, the circuitry of the present invention provides an accurate clamping voltage since there is only one clamping element between the signal line and ground. The actual clamping voltage is that clamping voltage rating of the first surge suppression means.

Another advantage of the present invention is that, because the signal line is not coupled to the shield line, a voltage surge or noise on the shield line does not affect and/or corrupt a signal or data on the signal line. The shield line is coupled to ground through the second surge suppression means which suppresses any voltage surge coming from ground. Such a voltage surge may come from the power surge protection system ground.

In another embodiment, the present invention provides a three stage surge protection circuit for a three conductor power supply system. Each of the three surge suppression stages includes circuitry for suppressing voltage surges across the line and neutral conductors. The surge suppression circuitry in each of the three stages preferably includes a first varistor coupled across the line conductor and the neutral conductor, a second varistor connected across the neutral conductor and the ground conductor, and a third varistor coupled across the line conductor and the ground conductor.

The first and third surge suppressing stages also preferably include a high speed clamping element, such as a Zener diode, coupled across the line conductor and the neutral conductor.

The surge protection circuit of the present invention also preferably includes a first noise filter stage coupled between the output of the first surge suppression stage and the input of the second surge suppression stage, and a second noise filter stage coupled between the output of the second surge suppression stage and the input of the third surge suppression stage. The first noise filter includes a first inductor coupled in series with the line conductor and a second inductor coupled in series with the neutral conductor. The second inductor is magnetically coupled to the first inductor. The first noise filter stage also includes a first capacitor coupled across the line conductor and the ground conductor and a second capacitor coupled across the neutral conductor and the ground conductor. The first and second capacitors are coupled to the output sides of the first and second inductors.

The second noise filter stage preferably includes a third inductor coupled in series with the line conductor and fourth inductor coupled in series with the neutral conductor. The fourth inductor is magnetically coupled to the third inductor. The second noise filter stage also includes first and second capacitors coupled across the line conductor and the neutral conductor, a third capacitor coupled across the neutral conductor and the ground conductor, and a fourth capacitor coupled across the line conductor and the ground conductor.

The first capacitor is coupled to the input side of the third inductor, and the second, third, and fourth capacitors are coupled to the output side of the third inductor.

The surge suppression circuit also preferably includes circuitry for indicating the failure of at least one stage of the surge suppression circuit. The indicating circuitry is coupled at the output of the third surge suppression stage across the line conductor and neutral conductor. The indicating circuitry is activated by failure of the second surge suppression stage, and alerts an operator that the surge suppression circuitry has failed.

The invention also preferably includes a cut-off circuit coupled between the output of the second surge suppression stage and the input of the third surge suppression stage. The cut-off circuit includes a varistor coupled across the line conductor and the neutral conductor and a thermal fuse coupled in series with the line conductor in close proximity to the varistor.

The invention further preferably includes a circuit breaker coupled in series with the line conductor at the input end of the first surge suppression stage to provide overload protection for the circuit. The circuit breaker is preferably a manual reset, 15 amp circuit breaker.

Other features and advantages of the present invention will become apparent from the following description of the invention which refers to the accompanying drawings.

DETAILED DESCRIPTION OF THE PREFERRED EMBODIMENTS

Figure 4:
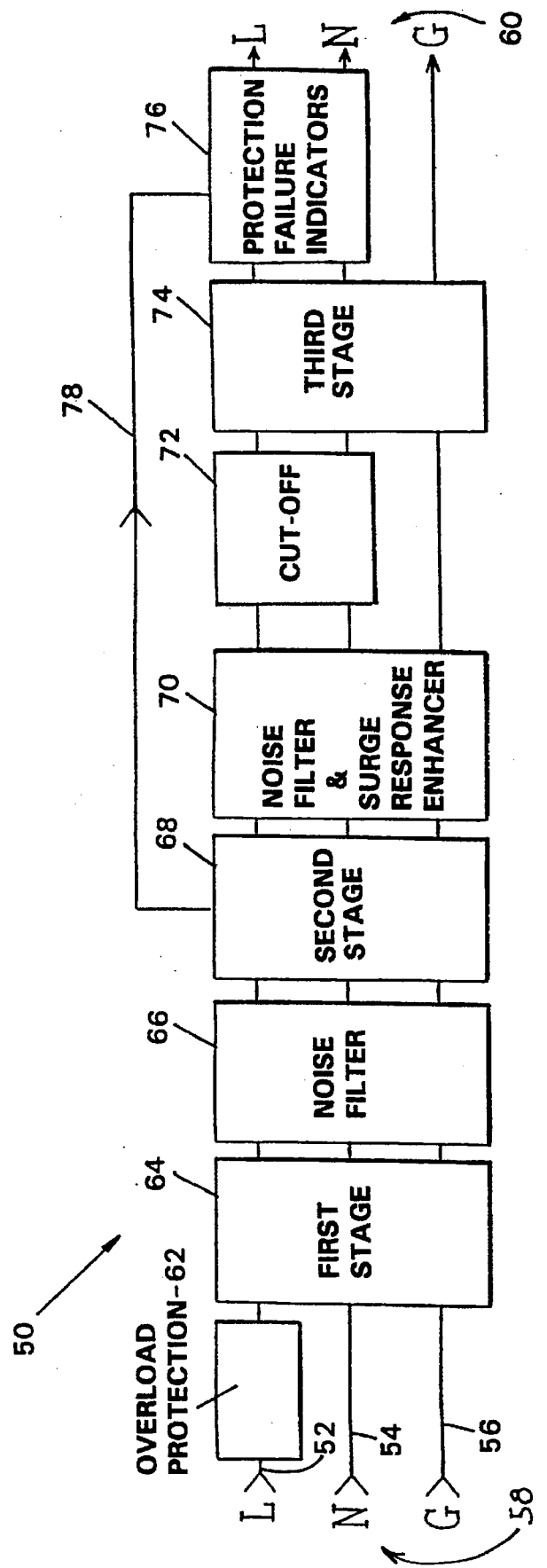
FIG. 4 is a block diagram of the three stage surge protection circuit according to a first embodiment of the present invention.
Figure 5:
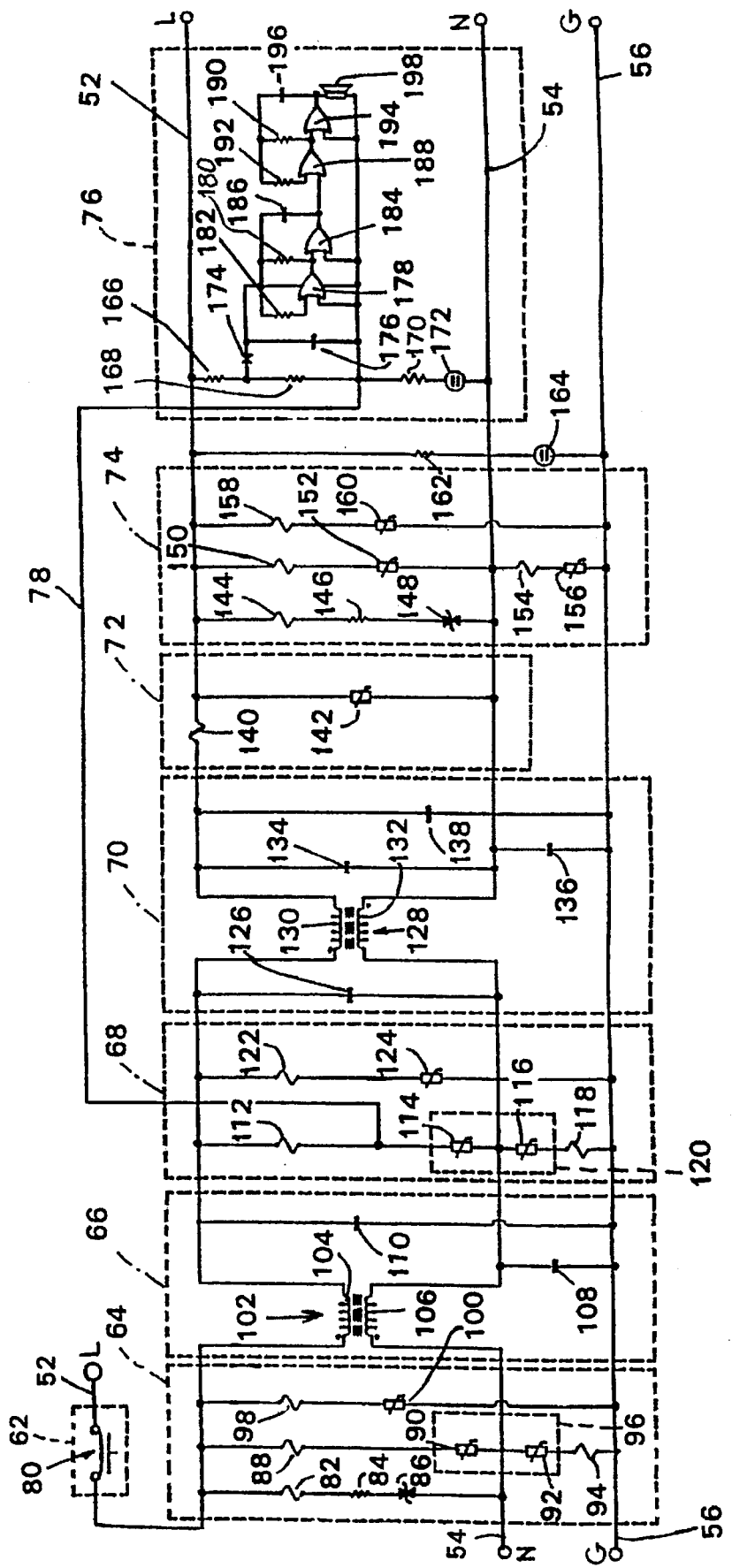
FIG. 5 is a schematic diagram illustrating the surge protection circuit of FIG. 4 in detail.

The first embodiment of the present invention is illustrated in FIGS. 4 and 5. FIG. 4 is a block diagram of the surge protection circuit 50. Surge protection circuit 50 is designed for use with a power supply system including a line conductor 52, a neutral conductor 54, and a ground conductor 56. Surge protection circuit 50 includes an input end 58 for coupling to a power source and an output end 60 for coupling to equipment to be protected.

Circuit 50 includes an overload protection device 62. The output of overload protection device 62 is connected to the input of a first surge protection stage 64. The first stage 64 is designed to clamp voltage surges and prevent the voltage surges from passing beyond first stage 64. First stage 64 includes a high speed clamping element and at least one voltage absorption element so that voltage surges passing through the first stage 64 will be clamped to ground by the combination of the high speed clamping element and the at least one voltage surge absorption element.

The output of first stage 64 is coupled to the input of a first noise filter 66. First noise filter 66 is a common EMI/RFI noise filter. First noise filter 66 also delays common voltage surges.

The output of noise filter 66 is coupled to second surge protection stage 68. Second stage 68 provides additional voltage surge protection in conjunction with first stage 64. Second stage 68 includes at least one voltage surge absorption element. The voltage surge absorption elements in second stage 68 absorb the voltage surges which pass beyond first stage 64. In addition, second stage 68 provides a signal through line 78 to trigger the protection failure indicators 76 as discussed below. If an incoming voltage surge is large enough to cause both the first stage 64 and a second stage 68 to fail, circuit 50 will provide a visual and audible alarm alerting a user to replace circuit 50.

The output of second stage 68 is coupled to an input of second noise filter 70. Second noise filter 70 is an EMI/RFI noise filter. Filter 70 operates to reduce common mode noises as well as transverse mode noises. In addition, second noise filter 70 improves the clamping response time of circuit 50 by delaying an incoming voltage surge.

The output of second noise filter 70 is coupled to the input of a cut-off circuit 72. Cut-off circuit 72 operates as a safety valve. For extremely high voltage surges, when the first and second stages 64 and 68 have failed or nearly failed, cut-off circuit 72 open circuits the supply of electricity at the equipment at output end 60 of circuit 50 through line 52 to reduce the likelihood that a voltage surge will pass through to the equipment.

The output of cut-off circuit 72 is coupled to the input of third surge protection stage 74. Third stage 74 is the final stage for voltage surge protection and provides protection against voltage surges which have passed through all previous stages. Third stage 74 includes both a high speed clamping element and high energy absorption elements. Third stage 74 provides protection for equipment even after the alarm has sounded indicating failure of the device. Therefore, third stage 74 can protect unattended equipment. Third stage 74 also protects the equipment in the event that a voltage surge passes through cut-off circuit 72.

The output of third stage 74 is coupled to the input of a protection failure indicator circuit 76. As discussed above, failure indicator circuit 76 is triggered by input 78 from second stage 68. The protection failure indicator circuit 76 produces both a visual and audible indicator. Indicator circuit 76 is located at the output end 60 of circuit 50 so that indicator circuit 76 will be protected from voltage surges.

In summary, the present invention provides three separate surge protection stages, each of which protects against voltage surges occurring from line to neutral, line to ground, and neutral to ground.

A detailed schematic diagram for surge protection circuit 50 is illustrated in FIG. 5. Overload protection 62 includes a circuit breaker 80. Circuit breaker 80 is preferably a 15 amp, manual reset circuit breaker. Circuit breaker 80 is coupled to line conductor 52 and provides overload protection for circuit 50.

The first surge suppression stage is illustrated by broken lines 64 and is coupled to the output from circuit breaker 80. In first stage 64, line conductor 52 is coupled through fuse 82, a 10 ohm resistor 84, and a Zener diode 86 to the neutral conductor 54. Preferably, Zener diode 86 is a 200 V, 1.6 J, bidirectional Zener diode such as a 1.5KE200 Zener diode available from General Instrument or equivalent. Line conductor 52 is also coupled through another fuse 88 and a MOV 90 to neutral conductor 54. Neutral conductor 54 is coupled through a MOV 92 and a third fuse 94 to ground 56. MOV 90 and MOV 92 are 20 mm, 130 V, 70 J MOVs available from Maida Development Company or equivalent. MOV 90 and MOV 92 may be a dual MOV package as illustrated by broken line 96. First stage 64 further includes a fourth fuse 98 and a third MOV 100 coupled in series across the line conductor 52 and ground 56. MOV 100 is a 20 mm, 150 V, 80 J, single varistor. The third MOV 100 is selected to maximize the clamping voltage rating (lowest clamping level) while minimizing the potential leakage to ground. The first varistor 90, while also coupled to the line conductor 52, does not have a leakage problem because it is coupled to neutral conductor 54 and not coupled directly to ground conductor 56.

The output of first surge suppression stage 64 is coupled to first noise filter stage 66. The first noise filter stage 66 includes an EMI/RFI filter coil 102 coupled between line conductor 52 and neutral conductor 54. Line conductor 52 is coupled through a first inductor 104 of filter coil 102, and neutral conductor 54 is coupled through a second inductor 106 of filter coil 102. First noise filter stage 66 also includes a 0.022 μF capacitor 108 coupled across neutral conductor 54 and ground conductor 56 and a 0.022 μF capacitor 110 coupled across line conductor 52 and ground conductor 56. Capacitors 108 and 110 are coupled on the output side of inductors 104 and 106. Noise filter stage 66 also acts to delay a voltage surge to facilitate clamping by later stages of circuit 50. The first noise filter stage 66 must be coupled to the output of the first surge suppression stage 64. Therefore, incoming voltage surges such as ring wave surges can be clamped before entering the filter coil 102. If such a voltage surge is not clamped before entering filter coil 102, the surge will create a "ringing" effect in the filter coil 102 and thus create problems.

The output of first noise filter stage 66 is coupled to second surge suppression stage 68. In second surge suppression stage 68, line conductor 52 is coupled through a fuse 112 and a MOV 114 to neutral conductor 54. The common terminal of fuse 112 and MOV 114 is coupled by line 78 to the protection failure indicators 76 as discussed below. Neutral conductor 54 is coupled through a MOV 116 and a fuse 118 to ground conductor 56. MOV 114 and MOV 116 are both 20 mm, 130 V, 70 J MOVs. MOV 114 and MOV 116 may be a dual MOV package as illustrated by broken line 120. Second surge suppression stage 68 also includes a fuse 122 and a MOV 124 coupled in series across line conductor 52 and ground conductor 56. MOV 124 is a 20 mm, 150 V, 80 J, single varistor.

Second noise filter stage 70 is coupled to the output of second surge suppression stage 68. Second noise filter-stage 70 includes a 0.1 μF capacitor 126 coupled across line conductor 52 and neutral conductor 54 on the input side of an EMI/RFI filter coil 128. Filter coil 128 is also coupled across line conductor 52 and neutral conductor 54. Line conductor 52 is coupled through a third inductor, and neutral conductor 54 is coupled through a fourth inductor of filter coil 128. Second noise filter stage 70 also includes three capacitors 134, 136, and 138 coupled on the output side of third inductor 130. 0.1 μF capacitor 134 is coupled across line conductor 52 and neutral conductor 54. 0.001 μF capacitor 136 is coupled across neutral conductor 54 and ground conductor 56. 0.001 μF capacitor 138 is coupled across line conductor 52 and ground conductor 56.

Second noise filter stage 70 must be situated at the input side of third surge suppression stage 74. Therefore, third surge suppression stage 74 can absorb the voltage surges that pass through all previous stages and also voltage surges from the protected equipment. This can happen if the equipment is isolated, for example by an isolation transformer.

The output of second noise filter stage 70 is coupled to the input of cut-off circuit 72. Cut-off circuit 72 is designed to cut off the electricity supplied to equipment coupled to the output end 60 of circuit 50 when an extremely high voltage surge occurs to prevent the surge from passing through the circuit 50. Cut-off circuit 72 includes a thermal fuse 140 coupled in series with line conductor 52 and an MOV 142 coupled across line conductor 52 and neutral conductor 54 in close proximity to thermal fuse 140. MOV 142 is preferably a 7 mm, 150 V, 12 J, single varistor.

The output of cut-off circuit 72 is coupled to the input of the third surge protection stage 74. The third surge protection stage 74 is provided to eliminate any voltage surges that pass through the previous stages. In third surge suppression stage 74, a series combination of a fuse 144, a 10 ohm resistor 146, and a bidirectional Zener diode 148 is coupled across line conductor 52 and neutral conductor 54. Line conductor 52 is also coupled through a fuse 150 and a MOV 152 to neutral conductor 54. Neutral conductor 54 is coupled through a fuse 154 and a MOV 156 to ground. In addition, line conductor 52 is coupled through a fuse 158 and a MOV 160 to ground 56. Zener diode 148 preferably is a 200 V, 1.6 J, bidirectional Zener diode such as a 1.5KE200 Zener diode available from General Instrument or equivalent. MOVs 152 and 160 are illustratively 20 mm, 150 V, 80 J, single varistors. MOV 156 illustratively is a 20 mm, 130 V, 70 J, single varistor. The values of the MOVs in circuit 50 are selected to provide voltage surge protection while minimizing leakage current.

Because MOV 142 is rated at 150 V and MOVs 90 and 114 are rated at 130 V, MOV 142 will not function until both MOVs 90 and 114 have failed. In addition, MOV 142 will not function until both Zener diode 86 and Zener diode 148 have failed. The energy absorption rate of MOV 142 is selected so that it is much smaller than the absorption rate for MOV 152. The voltage ratings for MOV 142 and MOV 152 are the same. Therefore, MOV 142 will fail before MOV 152. MOV 142 is coupled physically close to thermal fuse 140. Therefore, MOV 142 acts as a triggering device for thermal fuse 140. Once it can no longer function to protect the equipment, MOV 142 overheats and open circuits thermal fuse 140 to cut off the electricity through line conductor 54. Thermal fuse 140 is rated to break the line conductor 54 at 130° C. At the output of third stage 74, line conductor 52 is coupled through a 33 KΩ resistor 162 and an indicator light 164 to ground conductor 56.

Protection failure indicator stage 76 is coupled to the output of third stage 74. In indicator stage 76, line conductor 52 is coupled through the series combination of a 22 KΩ resistor 166, a 47 KΩ resistor 168, a 100 KΩ resistor 170, and an indicator light 172 to neutral conductor 54.

Indicator circuit 76 further includes a 1N4004 diode 174, a 33 μF capacitor 176, a NOR gate 178, a 220 k resistor 180, a 22 k resistor 182, a NOR gate 184, a 4.7 μF capacitor 186, a NOR gate 188, a 15 k resistor 190, a 22 k resistor 192, a NOR gate 194, a 0.0047 μF capacitor 196, and an audible signalling device 198, all coupled in circuit as illustrated. Input line 78 is connected to signalling device 198, and to inputs of NOR gates 178, 184, and 194. Indicator light 172 and audible signalling device 198 generate indications that the first and second stages 64 and 68 have failed due to a high voltage surge exceeding their capacities to suppress it. This alerts a user to replace circuit 50.

Indicator circuit 76 is positioned at the output end of circuit 50 so that the indicator circuit 76 is protected by all previous surge suppression stages 64, 68, 74 from a destructive voltage surge. Indicator circuit 76 is also protected and isolated by capacitor 176. Fuse 112 provides means for initiating indicator circuit 76. Fuse 112 has an ampere rating lower than all the other fuses used in circuit 50. Preferably, the ampere rating of fuse 112 is less than 5 amps.

Figure 6:
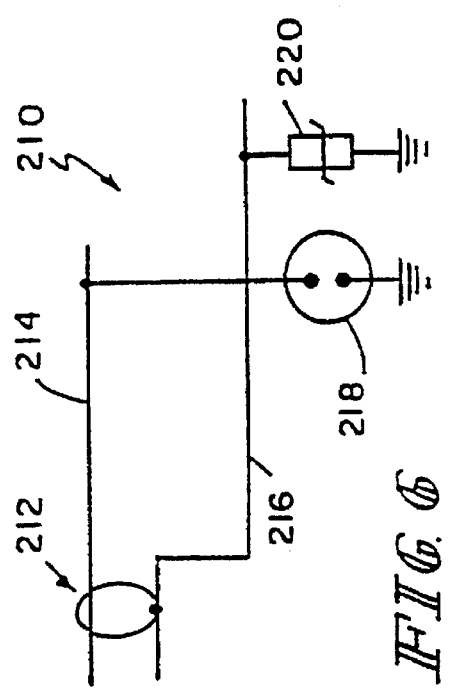
FIG. 6 is a schematic diagram of a second embodiment of the present invention for providing voltage surge protection for a coaxial cable.

The embodiments of the present invention related to surge protection for a low voltage signal line such as a coaxial cable input line are illustrated in FIGS. 6-9. FIG. 6 illustrates a surge protection circuit 210 for providing voltage surge protection for coaxial cable 212. Cable 212 includes a signal conductor 214 and a shield conductor 216. A gas tube 218 is coupled across signal conductor 214 and ground. Preferably, gas tube 218 is a 60211GO150 gas tube available from Bussman or equivalent. A MOV 220 is coupled across shield conductor 216 and ground.

Figure 2:
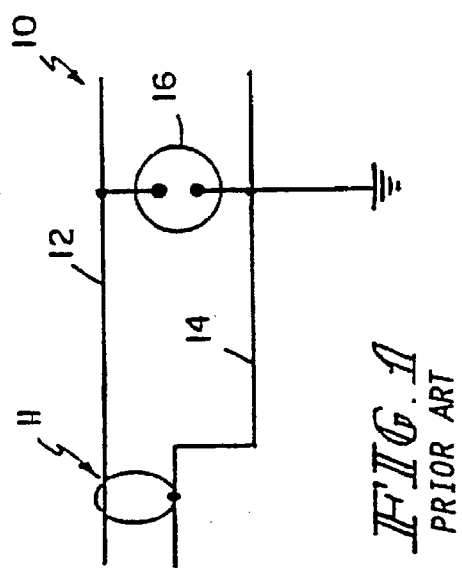
FIG. 2 is a schematic diagram illustrating another conventional surge suppression circuit for a coaxial cable.
Figure 3:
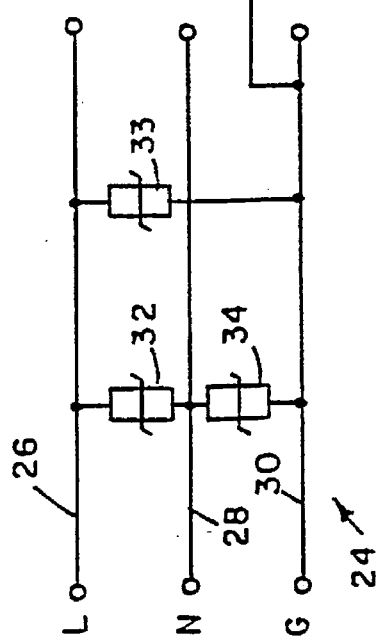
FIG. 3 is a schematic diagram illustrating yet another conventional surge suppression circuit in which a signal is supplied over a balanced line in combination with a conventional power source voltage surge protection circuit.

The circuit 210 of the present invention eliminates the "ground rise" effect problem since the shield is not directly connected to ground. Advantageously, however, if a voltage surge occurs across signal line 214 to ground, the surge is clamped to ground only by gas tube 218. Thus, the surge protection voltage is that voltage at which the gas in tube 218 ionizes to conduct. If a voltage occurs across shield conductor 216 to ground, that surge is clamped to ground by MOV 220 only. By eliminating the prior art's surge suppression device coupled between the signal conductor 214 and the shield conductor 216, a lower clamping voltage can be provided for a voltage surge on signal conductor 214 than in the prior art circuit shown in FIG. 2. This is because a voltage surge across either the signal conductor 214 or the shield conductor 216 must only pass through one surge suppression device (gas tube 218 or MOV 220, respectively) to ground. Therefore, the present invention advantageously reduces the ground rise effect without increasing the clamping voltage level for the signal conductor 214.

Figure 1:
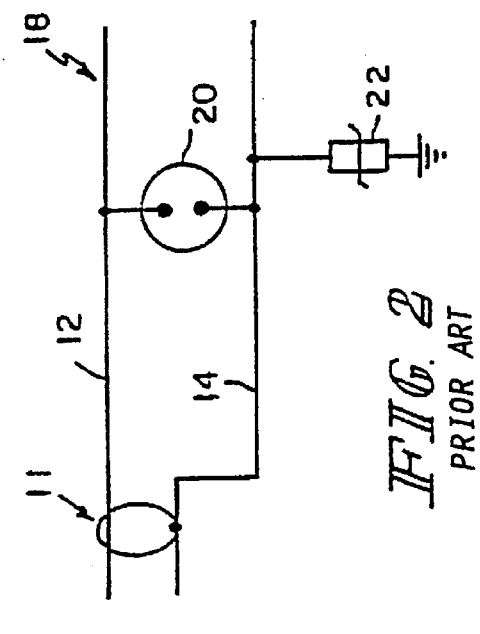
FIG. 1 is a schematic diagram illustrating a conventional surge suppression circuit for a coaxial cable.
Figure 9:
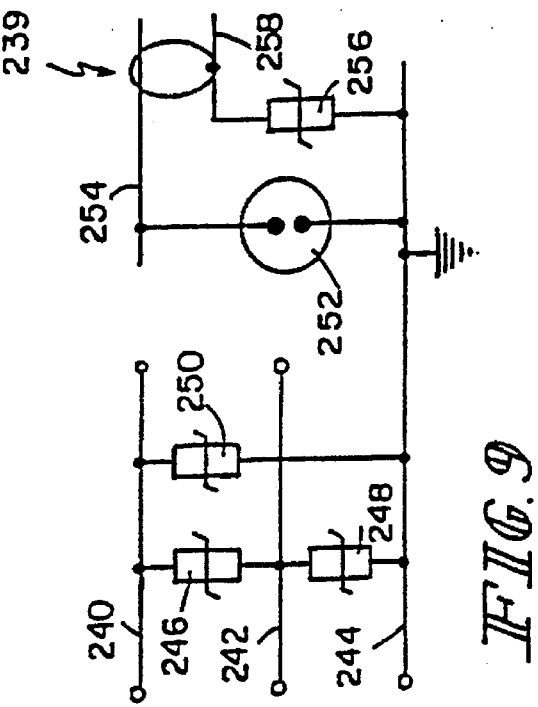
FIG. 9 is a schematic diagram illustrating the FIG. 6 embodiment used in combination with a conventional power source voltage surge protection circuit.

An additional reason for having a surge suppression component between the shield conductor and ground (such as MOV 220, MOV 228, or gas tube 238) is present when the coaxial circuit is used in conjunction with a conventional power suppression circuit similar to the circuit illustrated in FIG. 9. If a voltage surge originates from the cable side, for example lightning striking an antenna, the surge is isolated from the common ground that is also used by the power side. In conventional surge suppression devices such as shown in FIG. 1, a voltage surge entering through the shield conductor 14 can pass directly to the ground and thus create the "ground rise" effect discussed above.

Figure 7:
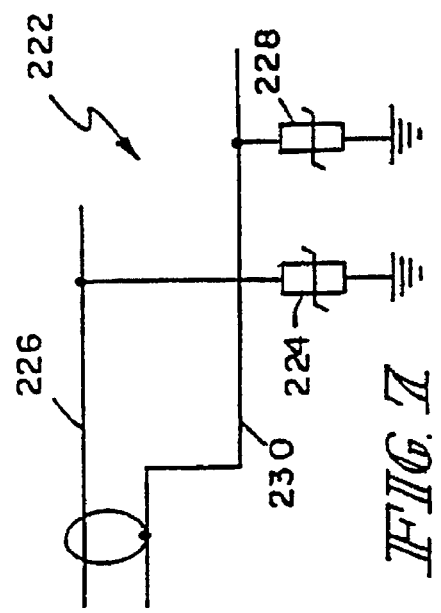
FIG. 7 is a schematic diagram of a third embodiment of the present invention for providing voltage surge protection for a coaxial cable.

In FIG. 7, a surge suppression circuit 222 includes a MOV 224 coupled across signal conductor 226 and ground. MOV 228 is coupled across shield conductor 230 and ground. This embodiment is used when the signal conductor 226 does not carry a high frequency signal. The MOVs 224 and 228 have higher capacitances than gas tubes such as gas tube 218 of the embodiment of FIG. 6. Such high capacitances can deleteriously affect high frequency signals, such as television signals.

Figure 8:
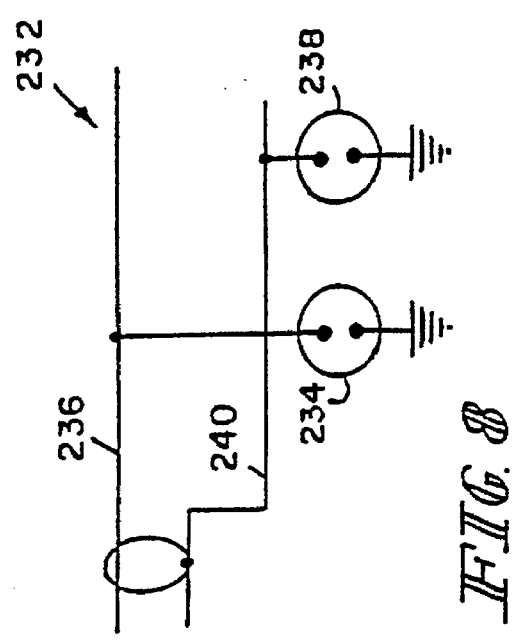
FIG. 8 is a schematic diagram of a fourth embodiment of the present invention for providing voltage surge protection for a coaxial cable.

The surge protection circuit 232 of FIG. 8 includes a gas tube 234 coupled across signal conductor 236 and ground. A gas tube 238 is coupled across shield conductor 240 and ground. This is a high frequency configuration suitable for replacement of the configurations of FIGS. 6-7.

FIG. 9 illustrates a surge protection circuit 239 used in conjunction with a conventional voltage surge suppression circuit for a household outlet having a line conductor 240, a neutral conductor 242, and a ground conductor 244. MOV 246 is coupled across line conductor 240 and neutral conductor 242. MOV 248 is coupled across neutral conductor 242 and ground conductor 244. MOV 250 is coupled across line conductor 240 and ground conductor 244. Surge protection circuit 239 includes a gas tube 252 coupled across the signal conductor 254 of a coaxial cable and the ground conductor 244. Circuit 239 also includes an MOV 256 coupled across shield conductor 258 and ground conductor 244.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A three-stage surge suppression circuit for a power supply system including a line conductor, a neutral conductor, and a ground conductor, the circuit including an input end for coupling to a power source and an output end for coupling to equipment to be protected, the circuit comprising:

a first surge suppression stage for suppressing voltage surges across the line and neutral conductors, said first surge suppression stage comprising a first Zener diode coupled across the line conductor and the neutral conductor, a first voltage surge absorption element coupled across the line conductor and the neutral conductor, in parallel with the first Zener diode, a second voltage surge absorption element coupled across the neutral conductor and the ground conductor, and a third voltage surge absorption element coupled across the line conductor and the ground conductor;

a second surge suppression stage coupled to an output from the first stage for suppressing voltage surges across the line and neutral conductors, said second surge suppression stage comprising a first voltage surge absorption element coupled across the line conductor and the neutral conductor, a second voltage surge absorption element coupled across the neutral conductor and the ground conductor, and a third voltage surge absorption element coupled across the line conductor and the ground conductor;

a third surge suppression stage coupled to an output from the second stage for suppressing voltage surges across the line and neutral conductors, said third surge suppression stage comprising a second Zener diode coupled across the line conductor and the neutral conductor, a first voltage surge absorption element coupled across the line conductor and the neutral conductor, in parallel with the second Zener diode, a second voltage surge absorption element coupled across the neutral conductor and the ground conductor, and a third voltage surge absorption element coupled across the line conductor and the ground conductor; and a surge suppression circuit for protecting a signal conductor and a ground shield conductor of a low voltage coaxial signal line, comprising:

first surge suppression means for providing surge suppression for the signal conductor, the first surge suppression means being coupled across the signal conductor and the ground conductor; and second surge suppression means for providing surge suppression for the ground shield conductor, the second surge suppression means being coupled across the ground shield conductor and the ground conductor.

2. The circuit of claim 1, wherein said first, second and third voltage surge absorption elements comprise varistors.

3. The circuit of claim 1, further comprising a first noise filter stage coupled between the output of the first surge suppression stage and the input of the second surge suppression stage, and a second noise filter stage coupled between the output of the second surge suppression stage and the input of the third surge suppression stage.

4. The circuit of claim 3, wherein the first noise filter stage includes a first inductor coupled in series with the line conductor and a second inductor coupled in series with the neutral conductor, the second inductor being magnetically coupled to the first inductor, a first capacitor coupled across the line conductor and the ground conductor, and a second capacitor coupled across the neutral conductor and the ground conductor.

5. The circuit of claim 4, wherein first and second capacitors are coupled to the output sides of the first and second inductors.

6. The circuit of claim 3, wherein the second noise filter stage includes a third inductor coupled in the line conductor and a fourth inductor coupled in the neutral conductor, the fourth inductor being magnetically coupled to the third inductor, first and second capacitors coupled across the line conductor and the neutral conductor, a third capacitor coupled across the neutral conductor and the ground conductor, and a fourth capacitor coupled across the line conductor and the ground conductor.

7. The circuit of claim 6, wherein the first capacitor is coupled to the input side of the third inductor, and the second, third, and fourth capacitors are coupled to the output side of the third inductor.

8. The circuit of claim 1, further comprising means for indicating failure of at least one stage of the surge suppression circuit.

9. The circuit of claim 8, wherein the indicating means is coupled to an output of the third surge suppression stage across the line conductor and neutral conductor, the indicating means being activated by failure of at least one of the first and the second surge suppression stages.

10. The circuit of claim 9, wherein the indicating means includes a visual indicator.

11. The circuit of claim 9, wherein the indicating means includes an audible indicator.

12. The circuit of claim 11, wherein the indicating means also includes a visual indicator.

13. The circuit of claim 9, wherein the second surge suppression stage further comprises a fuse connected in series with said first voltage surge absorption element of said second surge suppression stage, and the indicating means further comprises an input line coupled with said fuse for activating said indicating means.

14. The circuit of claim 9, wherein said third surge suppression stage continues to suppress voltage surges across the line and neutral conductors after said indicating means has been activated.

15. The circuit of claim 1, further comprising a cut-off circuit coupled between the output of the second surge suppression stage and the input of the third surge suppression stage, the cut-off circuit including a varistor coupled across the line conductor and the neutral conductor and a thermal fuse coupled to the line conductor in close proximity to the varistor, the thermal fuse being open circuited by heat generated by the varistor due to excessive current therethrough.

16. The circuit of claim 1, further comprising a circuit breaker coupled to the line conductor at the input end of the first surge suppression stage.

17. The circuit of claim 1, wherein the first surge suppression means comprises a gas tube, and the second surge suppression means comprises a varistor.

18. The circuit of claim 1, wherein the first and second surge suppression means each comprise a varistor.

19. The circuit of claim 1, wherein the first and second surge suppression means each comprise a gas tube.

* * * * *